United States Patent
Fukunaga et al.

(10) Patent No.: US 10,553,852 B2
(45) Date of Patent: Feb. 4, 2020

(54) METHOD FOR MANUFACTURING ELECTRODE AND METHOD FOR MANUFACTURING SECONDARY BATTERY

(71) Applicant: SANYO Electric Co., Ltd., Daito-shi, Osaka (JP)

(72) Inventors: Masao Fukunaga, Hyogo (JP); Ryosuke Shirota, Osaka (JP); Kazuya Nishio, Hyogo (JP); Haruya Nakai, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 29 days.

(21) Appl. No.: 15/337,220

(22) Filed: Oct. 28, 2016

(65) Prior Publication Data

US 2017/0125790 A1 May 4, 2017

(30) Foreign Application Priority Data

Oct. 30, 2015 (JP) .................. 2015-213992

(51) Int. Cl.
*H01M 4/04* (2006.01)
*H01M 4/139* (2010.01)
(Continued)

(52) U.S. Cl.
CPC ......... *H01M 4/0435* (2013.01); *H01M 2/162* (2013.01); *H01M 2/1653* (2013.01);
(Continued)

(58) Field of Classification Search
CPC ........... H01M 10/0587; H01M 10/058; H01M 4/0435; H01M 4/043; H01M 4/04; H01M 4/139; B30B 11/165; B30B 11/16
See application file for complete search history.

(56) References Cited

U.S. PATENT DOCUMENTS

2002/0197535 A1 12/2002 Dudley et al.
2005/0236732 A1* 10/2005 Brosch ................... B29C 43/22
264/210.2
(Continued)

FOREIGN PATENT DOCUMENTS

JP 2013-051040 A 3/2013
JP 5390721 B1 1/2014
(Continued)

OTHER PUBLICATIONS

English translation of JP 2014116141 (Year: 2014).*
Non-Final Office Action dated Oct. 15, 2018, issued in U.S. Appl. No. 15/337,488. (19 pages).

*Primary Examiner* — Yoshitoshi Takeuchi
(74) *Attorney, Agent, or Firm* — Westerman, Hattori, Daniels & Adrian, LLP (57) ABSTRACT

Disclosed is a method for manufacturing a positive electrode including a positive electrode substrate made of aluminum foil and a positive electrode active material layer containing a positive electrode active material on the positive electrode substrate. This method includes the steps of stretching a first exposed region of the positive electrode substrate with a first stretching roller disposed upstream; stretching a second exposed region of the positive electrode substrate with a second stretching roller disposed downstream; and compressing the positive electrode active material layer with a pair of compression rollers.

20 Claims, 8 Drawing Sheets

(51) Int. Cl.

| | |
|---|---|
| *H01M 2/16* | (2006.01) |
| *H01M 4/131* | (2010.01) |
| *H01M 4/133* | (2010.01) |
| *H01M 4/1391* | (2010.01) |
| *H01M 4/1393* | (2010.01) |
| *H01M 4/587* | (2010.01) |
| *H01M 4/62* | (2006.01) |
| *H01M 10/0525* | (2010.01) |
| *H01M 10/0587* | (2010.01) |
| *H01M 4/505* | (2010.01) |
| *H01M 4/525* | (2010.01) |
| *H01M 4/66* | (2006.01) |
| *H01M 4/02* | (2006.01) |

(52) U.S. Cl.
CPC ......... *H01M 4/0404* (2013.01); *H01M 4/131* (2013.01); *H01M 4/133* (2013.01); *H01M 4/1391* (2013.01); *H01M 4/1393* (2013.01); *H01M 4/587* (2013.01); *H01M 4/623* (2013.01); *H01M 4/625* (2013.01); *H01M 10/0525* (2013.01); *H01M 10/0587* (2013.01); *H01M 4/505* (2013.01); *H01M 4/525* (2013.01); *H01M 4/661* (2013.01); *H01M 2004/027* (2013.01); *H01M 2004/028* (2013.01); *H01M 2220/20* (2013.01)

(56) References Cited

U.S. PATENT DOCUMENTS

| | | |
|---|---|---|
| 2007/0048613 A1 | 3/2007 | Yanagida et al. |
| 2012/0058375 A1* | 3/2012 | Tanaka .................. H01M 4/13 429/94 |
| 2013/0048340 A1 | 2/2013 | Bando et al. |
| 2013/0074711 A1 | 3/2013 | Uematsu et al. |
| 2013/0326865 A1 | 12/2013 | Kobayashi et al. |

FOREIGN PATENT DOCUMENTS

| | | | |
|---|---|---|---|
| JP | 2014-035876 A | 2/2014 | |
| JP | 2014-116141 A | 6/2014 | |
| JP | 2014116141 | * 6/2014 | .............. H01M 4/04 |
| JP | 2015-026562 A | 2/2015 | |
| WO | 2012/111815 A1 | 8/2012 | |

* cited by examiner

METHOD FOR MANUFACTURING ELECTRODE AND METHOD FOR MANUFACTURING SECONDARY BATTERY

CROSS REFERENCE TO RELATED APPLICATIONS

The present invention application claims priority to Japanese Patent Application No. 2015-213992 filed in the Japan Patent Office on Oct. 30, 2015, the entire contents of which are incorporated herein by reference.

BACKGROUND OF THE INVENTION

Field of the Invention

The present invention relates to methods for manufacturing electrodes for applications such as nonaqueous electrolyte secondary batteries and methods for manufacturing secondary batteries.

Description of Related Art

Secondary batteries, such as nonaqueous electrolyte secondary batteries, have been used as power supplies for driving electric vehicles (EVs), hybrid electric vehicles (HEVs and PHEVs), and other systems.

Secondary batteries include positive and negative electrodes, each composed of a substrate made of metal foil and an active material layer containing an active material on the substrate. There is a need for a secondary battery with a higher volume energy density for electric vehicles (EVs), hybrid electric vehicles (HEVs and PHEVs), and other systems. One approach to increase the volume energy density of secondary batteries is to increase the packing density of the active material layer. This increases the amount of active material present in the casing and thus increases the volume energy density. The packing density of the active material layer can be increased, for example, by forming the active material layer on the substrate and then compressing the active material layer at a higher pressure using a machine such as a roller press.

However, if the active material layer formed on the substrate is compressed at a higher pressure, both the active material layer and the region of the substrate where the active material layer is formed are compressed at a higher pressure; therefore, the substrate is rolled. If the substrate has exposed regions where no active material layer is formed along the lateral edges of the electrode in the longitudinal direction, the exposed regions of the substrate are not pressed during compression since they are thinner than the region where the active material layer is formed. Thus, whereas the region of the substrate where the active material layer is formed is rolled during compression, the exposed regions of the substrate are not rolled. This results in a difference in length in the longitudinal direction between the region of the substrate where the active material layer is formed and the exposed regions of the substrate. The difference in length in the longitudinal direction over the substrate causes creases in the substrate and warpage in the electrode.

To solve this problem, Japanese Patent No. 5390721 (Patent Document 1) proposes a technique involving stretching exposed regions of a substrate of an electrode in advance before roller-pressing the electrode.

BRIEF SUMMARY OF THE INVENTION

The inventors have newly found the following problem during research on methods for manufacturing electrodes. An electrode includes a strip-shaped substrate and an active material layer extending across the substrate in the longitudinal direction. The substrate has first and second exposed regions extending in the longitudinal direction on opposing sides of the region of the substrate where the active material layer is formed. If the first and second exposed regions of the substrate are simultaneously stretched in advance before the step of compressing the active material layer, they might not be stretched as intended. If the first and second exposed regions of the substrate are not stretched as intended, creases may occur in the substrate during the compression of the active material layer despite the stretching of the exposed regions of the substrate in advance before the step of compressing the active material layer.

An object of the present invention is to solve the foregoing problems and provide an electrode with high packing density and high reliability and a secondary battery with high volume energy density and high reliability.

According to one aspect of the present invention, there is provided a method for manufacturing an electrode including a strip-shaped substrate and an active material layer containing an active material on the substrate. This method includes the steps of forming the active material layer on the substrate in a longitudinal direction of the substrate such that the substrate has first and second exposed regions extending in the longitudinal direction of the substrate on opposing sides of the active material layer in a lateral direction of the substrate; stretching the first exposed region of the substrate after the step of forming the active material layer; stretching the second exposed region of the substrate after the first stretching step; and compressing the active material layer after the second stretching step.

The separate stretching of the first and second exposed regions of the substrate as described above allows them to be more reliably stretched as intended and to be more uniformly stretched in the longitudinal direction.

The first stretching step preferably includes stretching the first exposed region of the substrate with a first stretching roller in abutment with the first exposed region of the substrate. The second stretching step preferably includes stretching the second exposed region of the substrate with a second stretching roller, different from the first stretching roller, in abutment with the second exposed region of the substrate.

A guide roller is preferably disposed between the first and second stretching rollers, and the substrate is preferably tensioned by the guide roller.

A path through which the substrate passes preferably includes, in order from upstream, the first stretching roller, the guide roller, and the second stretching roller.

The first stretching roller preferably includes a first body and a first large-diameter portion having a larger diameter than the first body. The second stretching roller preferably includes a second body and a second large-diameter portion having a larger diameter than the second body. The first large-diameter portion preferably stretches the first exposed region of the substrate. The second large-diameter portion preferably stretches the second exposed region of the substrate.

According to another aspect of the present invention, there is provided a method for manufacturing a secondary battery. This method includes the steps of fabricating an electrode assembly including a positive electrode, a negative electrode, and a separator; and placing the electrode assembly and a nonaqueous electrolyte in a casing. The positive electrode is manufactured by the method described above.

The present invention provides an electrode with high packing density and high reliability.

DETAILED DESCRIPTION OF THE INVENTION

A positive electrode for nonaqueous electrolyte secondary batteries according to an embodiment of the present invention will now be described by way of example. It should be understood that the following embodiments are not intended to limit the present invention.

Positive Electrode Active Material Layer Slurry

A positive electrode active material layer slurry is prepared by mixing lithium nickel cobalt manganese oxide, serving as a positive electrode active material, poly(vinylidene fluoride) (PVdF), serving as a binder, a carbonaceous material, serving as a conductor, and N-methylpyrrolidone (NMP), serving as a solvent. Lithium nickel cobalt manganese oxide, PVdF, and the carbonaceous material are mixed in a mass ratio of 97.5:1:1.5. The mass percentage of the positive electrode active material in the positive electrode active material layer is preferably 95% by mass or more and is preferably 99% by mass or less. The mass percentage of the binder in the positive electrode active material layer is preferably less than 5% by mass, more preferably 3% by mass or less. The mass percentage of the binder in the positive electrode active material layer is preferably 0.5% by mass or more.

Protective Layer Slurry

A protective layer slurry is prepared by mixing alumina powder, graphite, serving as a conductor, poly(vinylidene fluoride) (PVdF), serving as a binder, and N-methylpyrrolidone (NMP), serving as a solvent. Alumina powder, graphite, and PVdF are mixed in a mass ratio of 83:3:14. The mass percentage of the binder in the protective layers is preferably 5% by mass or more, more preferably 8% by mass or more, even more preferably 10% by mass or more. Although the protective layers may be made of the binder alone, they preferably contain inorganic oxides such as alumina, zirconia, titania, and silica. The protective layers preferably contain no positive electrode active material. If the protective layers contain a positive electrode active material, the mass percentage of the positive electrode active material in the protective layers is preferably 10% by mass or less, more preferably 5% by mass or less, even more preferably 1% by mass or less.

Active-Material-Layer Forming Step and Protective-Layer Forming Step

The positive electrode active material layer slurry and the protective layer slurry are applied to each surface of a strip of aluminum foil with a thickness of 15 μm, serving as a positive electrode substrate, by a die coater. The positive electrode active material layer slurry is applied to the lateral center of the positive electrode substrate, whereas the protective layer slurry is applied along the lateral edges of the region where the positive electrode active material layer slurry is applied. The positive electrode active material layer slurry and the protective layer slurry may be simultaneously applied to the positive electrode substrate using a single die coater, where the positive electrode active material layer slurry and the protective layer slurry may be brought together inside a die head near a slot. The positive electrode active material layer slurry and the protective layer slurry, however, need not be simultaneously applied to the positive electrode substrate.

The positive electrode active material layer slurry and the protective layer slurry applied to the positive electrode substrate are dried to remove NMP therefrom. In this way, a positive electrode active material layer and protective layers are formed.

Figure 1:
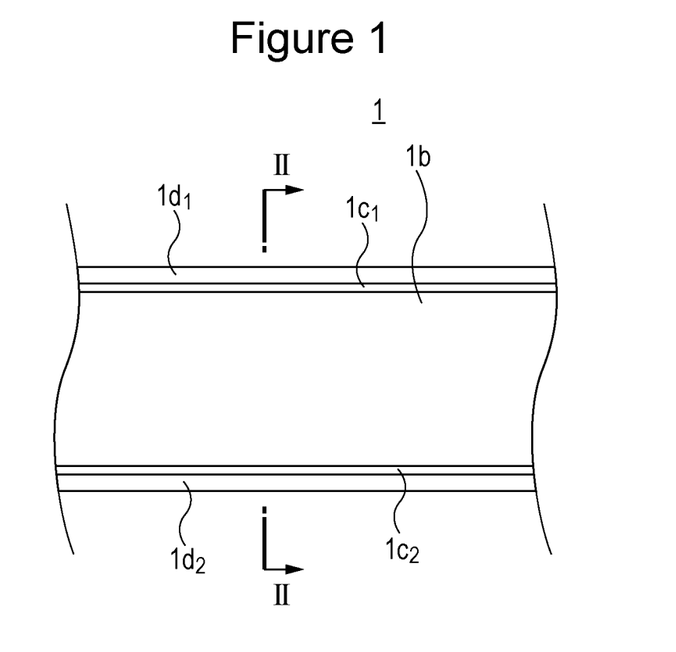
FIG. 1 is a plan view of a positive electrode according to an embodiment before compression.
Figure 2:
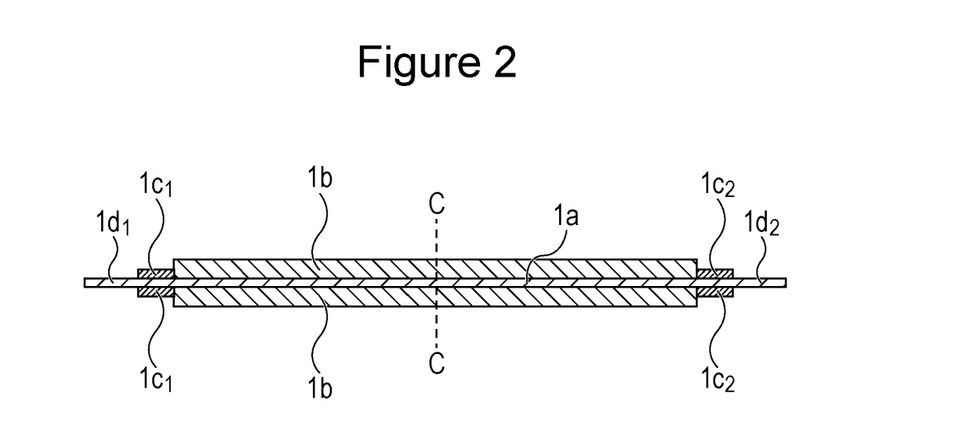
FIG. 2 is a sectional view taken along line II-II in FIG. 1.

FIG. 1 is a plan view of a positive electrode 1 fabricated as described above before compression. FIG. 2 is a sectional view taken along line II-II in FIG. 1. As shown in FIG. 1, the positive electrode 1 includes a positive electrode substrate 1a and a positive electrode active material layer 1b extending in the lateral center of the positive electrode 1 in the longitudinal direction of the positive electrode 1. The positive electrode 1 further includes protective layers (first protective layer $1c_1$ and second Protective layer $1c_2$) extending along the lateral edges of the region of the positive electrode substrate 1a where the positive electrode active material layer 1b is formed. The positive electrode substrate 1a has exposed regions (first exposed region $1d_1$ and second exposed region $1d_2$) extending along the lateral edges of the positive electrode 1 in the longitudinal direction of the positive electrode 1.

Figure 3:
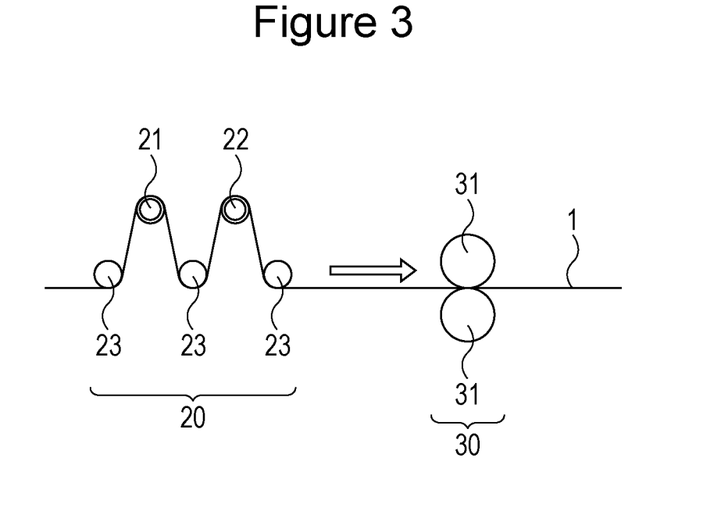
FIG. 3 illustrates a stretching unit and a compression unit.

FIG. 3 illustrates a stretching unit 20 for stretching the exposed regions $1d_1$ and $1d_2$ of the positive electrode substrate 1a of the positive electrode 1 and a compression unit 30 for compressing the positive electrode 1. The positive electrode 1, which is strip-shaped, passes through the stretching unit 20, which stretches the exposed regions $1d_1$ and $1d_2$ of the positive electrode substrate 1a, and then through the compression unit 30, which compresses the positive electrode active material layer 1b. The compression of the positive electrode active material layer 1b increases its packing density.

Figure 4A:
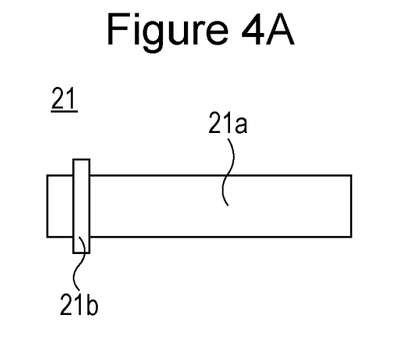
FIGS. 4A to 4C illustrate stretching rollers and guide rollers.
Figure 4B:
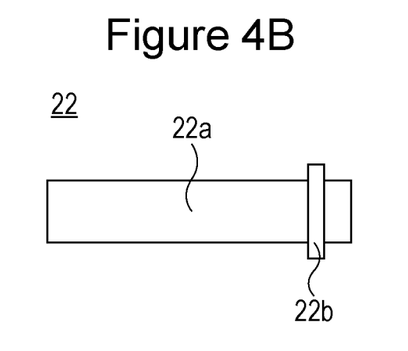
Figure 4C:
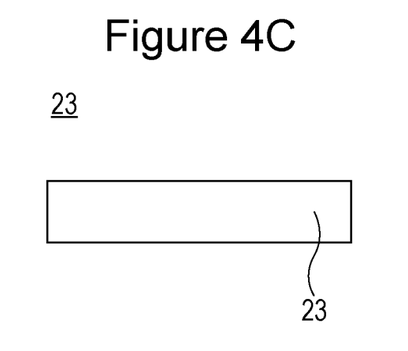

As shown in FIG. 3, the stretching unit 20 includes a first stretching roller 21, a second stretching roller 22, and three guide rollers 23. FIG. 4A is a plan view of the first stretching roller 21. FIG. 4B is a plan view of the second stretching roller 22. FIG. 4C is a plan view of the guide rollers 23.

The first stretching roller 21 includes a body 21a and a large-diameter portion 21b having a larger diameter than the body 21a on one side of the body 21a in the lateral direction. The second stretching roller 22 includes a body 22a and a large-diameter portion 22b having a larger diameter than the body 22a on the other side of the body 22a in the lateral direction. The large-diameter portion 21b of the first stretching roller 21 is located on one side (closer to the viewer in FIG. 3) in the lateral direction (from front to rear in FIG. 3 and from left to right in FIGS. 4A to 4C), whereas the large-diameter portion 22b of the second stretching roller 22 is located on the other side (farther away from the viewer in FIG. 3) in the lateral direction.

The positive electrode 1 passes through the stretching unit 20 while being tensioned by the rollers 21 to 23. The large-diameter portion 21b of the first stretching roller 21 pushes the first exposed region $1d_1$ of the positive electrode substrate 1a of the positive electrode 1 outward, thereby stretching the first exposed region $1d_1$ of the positive electrode substrate 1a. The large-diameter portion 22b of the second stretching roller 22 pushes the second exposed region $1d_2$ of the positive electrode substrate 1a of the positive electrode 1 outward, thereby stretching the second exposed region $1d_2$ of the positive electrode substrate 1a. The exposed regions $1d_1$ and $1d_2$ of the positive electrode substrate 1a are thus stretched before compression.

Figure 5:
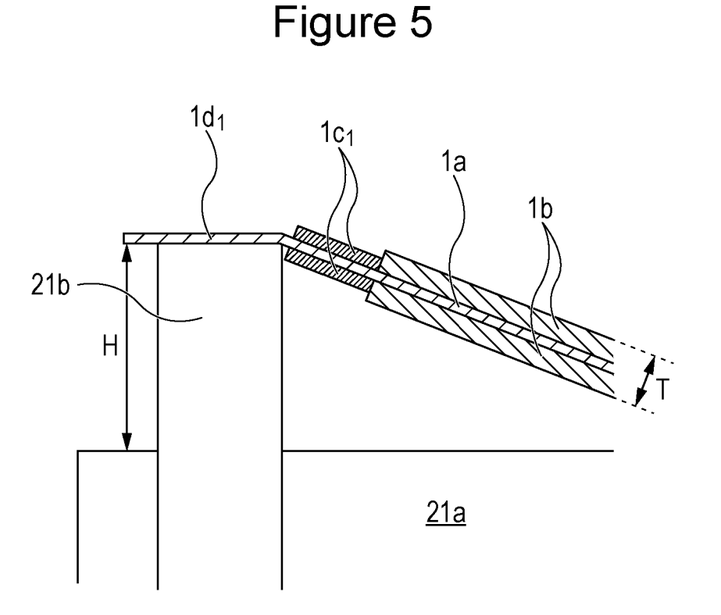
FIG. 5 illustrates a positive electrode in contact with a stretching roller.

FIG. 5 illustrates how the large-diameter portion 21b of the first stretching roller 21 pushes the first exposed region $1d_1$ of the positive electrode substrate 1a of the positive electrode 1 outward. The large-diameter portion 21b of the first stretching roller 21 pushes the first exposed region $1d_1$ of the positive electrode substrate 1a of the positive electrode 1 outward, thereby stretching the first exposed region $1d_1$ of the positive electrode substrate 1a. Similarly, the large-diameter portion 22b of the second stretching roller 22 pushes the second exposed region $1d_2$ of the positive electrode substrate 1a of the positive electrode 1 outward.

Although not illustrated in FIG. 5, the body 21a of the first stretching roller 21 is in contact with the positive electrode active material layer 1b of the positive electrode 1 in the lateral center of the positive electrode 1. Similarly, the body 22a of the second stretching roller 22 is in contact with the positive electrode active material layer 1b of the positive electrode 1 in the lateral center of the positive electrode 1.

After the exposed regions $1d_1$ and $1d_2$ of the positive electrode substrate 1a are stretched, the positive electrode 1 passes through the compression unit 30, where a pair of compression rollers 31 compress the positive electrode 100 to increase the packing density of the positive electrode active material layer 1b. During this process, the region of the positive electrode substrate 1a where the positive electrode active material layer 1b is formed is rolled and stretched in the longitudinal direction of the positive electrode 1. The stretching of the exposed regions $1d_1$ and $1d_2$ of the positive electrode substrate 1a of the positive electrode 1 in advance prevents defects such as creases in the positive electrode substrate 1a and warpage in the positive electrode 1 when the region of the positive electrode substrate 1a where the positive electrode active material layer 1b is formed is rolled during compression.

The compressed positive electrode 1 is cut along line C-C in FIG. 2, followed by coiling and cutting to a predetermined length for the fabrication of electrode assemblies.

The positive electrode 1 has the protective layers $1c_1$ and $1c_2$ extending along the lateral edges of the positive electrode active material layer 1b on the positive electrode substrate 1a. This prevents problems such as damage to the positive electrode active material layer 1b and its separation from the positive electrode substrate 1a when the exposed regions $1d_1$ and $1d_2$ of the positive electrode substrate 1a are stretched before the compression of the positive electrode 1. The protective layers $1c_1$ and $1c_2$, however, are optional and may be omitted.

As described above, it is preferred to separately stretch the exposed regions of the positive electrode substrate with different stretching rollers. The separate stretching of the exposed regions of the positive electrode substrate allows them to be more reliably and uniformly stretched and, if necessary, allows them to be stretched to their respective intended degrees. Alternatively, the exposed regions of the positive electrode substrate may be simultaneously stretched with a single stretching roller.

As shown in FIG. 5, the height H of the large-diameter portion 21b from the body 21a of the first stretching roller 21 is preferably sufficiently larger than the thickness T of the region of the positive electrode 1 where the positive electrode active material layer 1b is formed before compression. Specifically, H (mm)/T (mm) is preferably 3 or more, more preferably 5 or more, even more preferably 7 or more. This allows the first exposed region $1d_1$ of the positive electrode substrate 1a to be more reliably and uniformly stretched. In this case, the body 21a of the first stretching roller 21 is preferably in contact with the positive electrode active material layer 1b of the positive electrode 1. The large-diameter portion 22b of the second stretching roller 22 is preferably similar to the large-diameter portion 21b of the first stretching roller 21.

The stretching unit 20 preferably applies a tension of 100 to 600 N, more preferably 200 to 500 N, to the positive electrode 1. The positive electrode 1 preferably passes through the stretching unit 20 at a speed of 10 to 110 m/min, more preferably 30 to 100 m/min. The first stretching roller 21, the second stretching roller 22, and the guide rollers 23 are each preferably made of a metal or resin. For example, the central shaft of each roller may be a cylindrical member made of a metal such as stainless steel, and the surface layer may be a tubular resin member. In this case, the central shaft of the first stretching roller 21 is a cylindrical metal member, and the surface layer is a resin member. The surface layer of the body 21a and the large-diameter portion 21b are made of a resin.

The protective layer slurry preferably has a lower viscosity than the positive electrode active material layer slurry when they are applied to the positive electrode substrate 1a. If no protective layer is provided, the positive electrode active material layer slurry may form wavy, non-straight lateral edges when applied. This may result in variations in the width of the exposed regions of the positive electrode substrate and may therefore result in variations in the degree of stretching of the exposed regions of the positive electrode substrate during stretching. In contrast, if a protective layer slurry having a lower viscosity than the positive electrode active material layer slurry is applied to the positive electrode substrate, it forms protective layers with more straight edges and thus allows for less variation in the width of the exposed regions of the positive electrode substrate.

The positive electrode active material layer slurry preferably has a viscosity of 1.50 Pa·s or more, more preferably 1.50 to 3.50 Pa·s, even more preferably 1.80 to 3.00 Pa·s. The protective layer slurry preferably has a viscosity of 0.50 to 1.8 Pa·s, more preferably 0.60 to 1.50 Pa·s. The viscosity can be adjusted by changing the type and amount of binder in the slurry and the amount of solvent. The viscosity of the positive electrode active material layer slurry and the viscosity of the protective layer slurry can be measured with a spiral viscometer (PC-1TL, Malcom Co., Ltd.) at 40 rpm and 25° C.

First Modification

Figure 6:
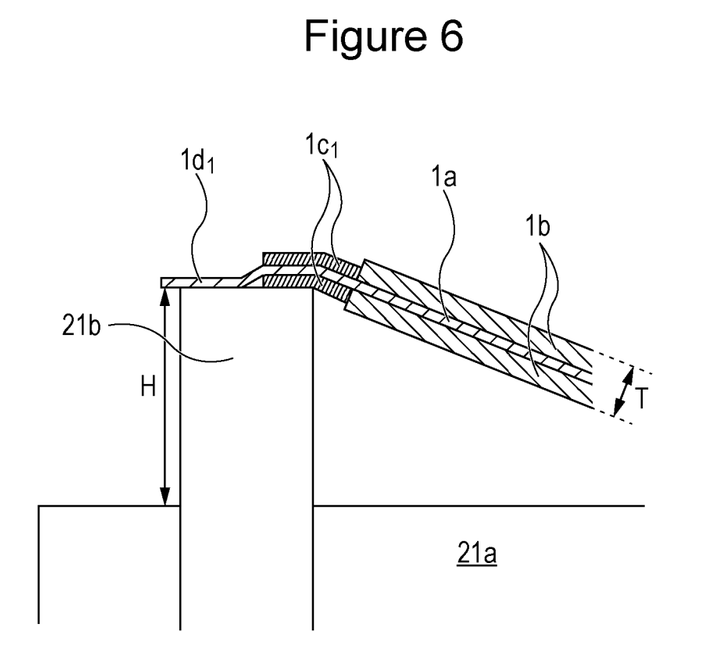
FIG. 6 illustrates a positive electrode in contact with a stretching roller according to a first modification.

In the step of stretching the exposed regions of the positive electrode substrate, the large-diameter portions of the stretching rollers may be in contact with the exposed regions of the positive electrode substrate, the protective layers, or both during the stretching of the exposed regions of the positive electrode substrate. For example, as shown in FIG. 6, the large-diameter portion 21b of the first stretching roller 21 may be in contact with the first protective layer $1c_1$. Preferably, the large-diameter portion 21b abuts the first protective layer $1c_1$ of the positive electrode 1 to stretch both the first exposed region $1d_1$ of the positive electrode substrate 1a and the region of the positive electrode substrate 1a where the first protective layer $1c_1$ is formed. This more reliably prevents creases in the first exposed region $1d_1$ of the positive electrode substrate 1a and warpage in the positive electrode 1 if the region of the positive electrode substrate 1a where the first protective layer $1c_1$ is formed is not rolled or is rolled to a lower extent than the region where the positive electrode active material layer 1b is formed during the compression of the positive electrode active material layer 1b.

The first modification is particularly effective if the mass fraction of the binder in the protective layers is larger than the mass fraction of the binder in the active material layer. The first modification is more effective if the first protective layer $1c_1$ is thinner than the positive electrode active material layer 1b. If the protective layers, such as the first protective layer $1c_1$, contain more binder than the active material layer, such as the positive electrode active material layer 1b, the protective layers are more flexible than the active material layer. Such protective layers are less likely to be damaged when pushed by the large-diameter portion 21b.

The large-diameter portion 21b of the first stretching roller 21 is preferably not in contact with the positive electrode active material layer 1b. This more reliably prevents damage to the edges of the positive electrode active material layer 1b due to contact with the large-diameter portion 21b of the first stretching roller 21. As shown in FIG. 6, a clearance is preferably provided between the large-diameter portion 21b of the first stretching roller 21 and the positive electrode active material layer 1b. Specifically, the shortest distance between the large-diameter portion 21b of the first stretching roller 21 and the positive electrode active material layer 1b is preferably larger than the thickness of the positive electrode substrate 1a before compression.

As in the first modification, the first and second exposed regions $1d_1$ and $1d_2$ of the positive electrode substrate 1a were stretched by 0.3% in the longitudinal direction of the positive electrode 1 before the positive electrode 1 was compressed to increase the packing density of the positive electrode active material layer 1b to 2.9 g/cm$^3$. The resulting positive electrode 1 had no defects such as creases or warpage.

Second Modification

Figure 7:
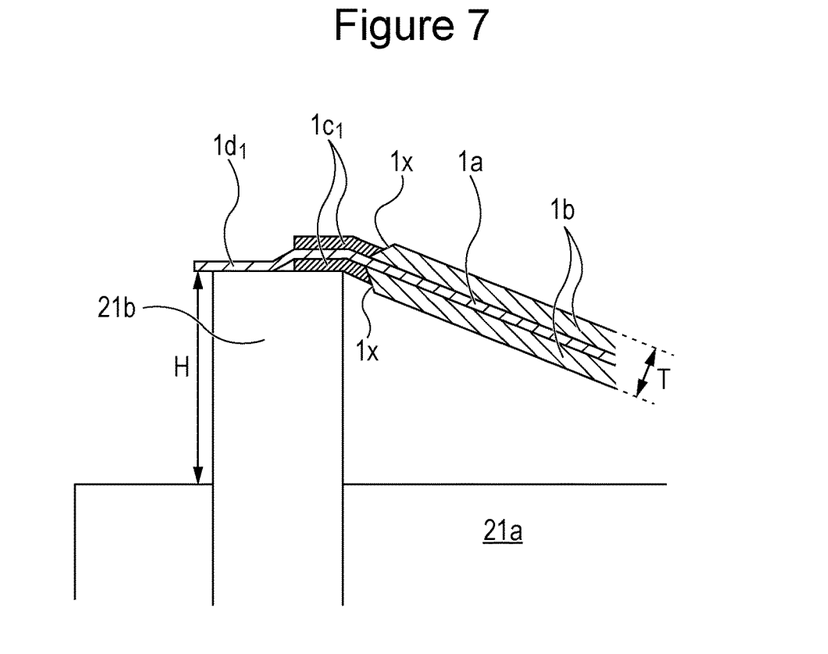
FIG. 7 illustrates a positive electrode in contact with a stretching roller according to a second modification.

FIG. 7, which corresponds to FIG. 5, illustrates a positive electrode substrate according to a second modification. As shown in FIG. 7, the end surfaces 1x of the lateral edges of the positive electrode active material layer 1b may be inclined (at an angle of less than 90°) from the positive electrode substrate 1a, and part of the first protective layer $1c_1$ may be located on the end surfaces 1x of the positive electrode active material layer 1b. This more effectively prevents problems such as damage to the positive electrode active material layer 1b and its separation from the positive electrode substrate 1a when the exposed regions $1d_1$ and $1d_2$ of the positive electrode substrate 1a are stretched before the compression of the positive electrode 1.

Third Modification

Figure 8:
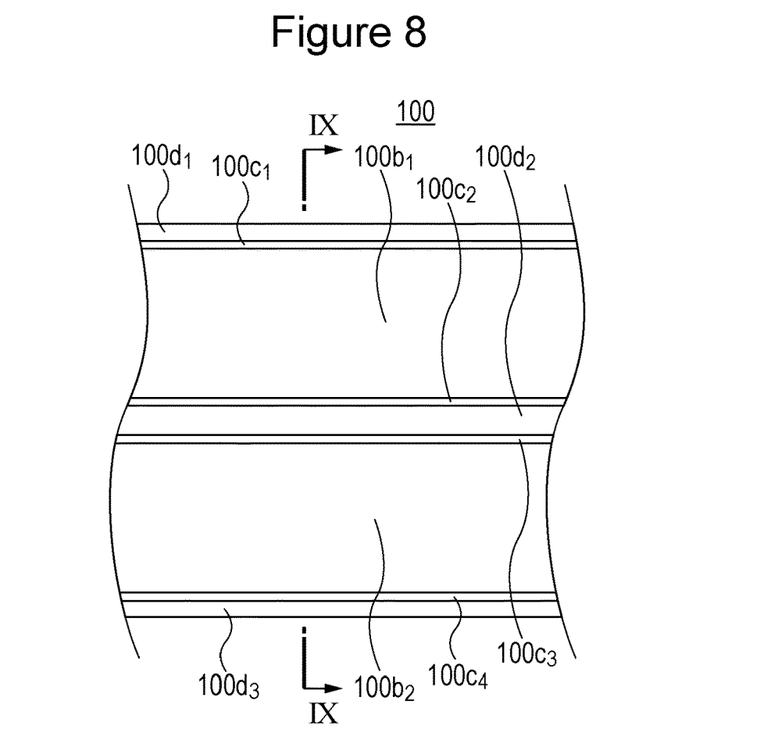
FIG. 8 is a plan view of a positive electrode according to a third modification before compression.
Figure 9:
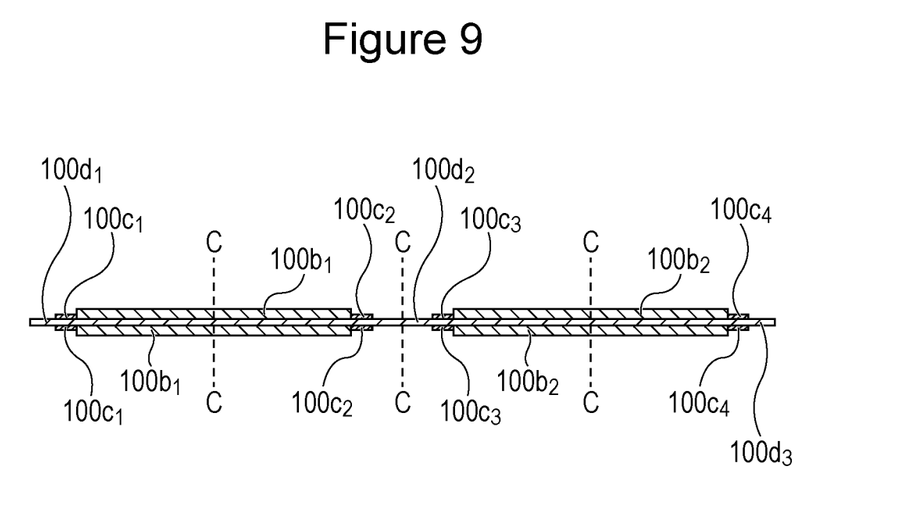
FIG. 9 is a sectional view taken along line IX-IX in FIG. 8.

FIG. 8 is a plan view of a positive electrode 100 according to a third modification before compression. FIG. 9 is a sectional view taken along line IX-IX in FIG. 8. The positive electrode 100 includes a positive electrode substrate 100a and two positive electrode active material layers (first positive electrode active material layer $100b_1$ and second positive electrode active material layer $100b_2$) extending across the positive electrode substrate 100a in the longitudinal direction. The positive electrode 100 further includes first and second protective layers $100c_1$ and $100c_2$ extending along the lateral edges of the first positive electrode active material layer $100b_1$ in the longitudinal direction of the positive electrode 100. The positive electrode 100 further includes third and fourth protective layers $100c_3$ and $100c_4$ extending along the lateral edges of the second positive electrode active material layer $100b_2$ in the longitudinal direction of the positive electrode 100. The positive electrode substrate 100a has first, second, and third exposed regions $100d_1$, $100d_2$, and $100d_3$ separated from each other in the lateral direction and extending in the longitudinal direction of the positive electrode 100.

Figure 10:
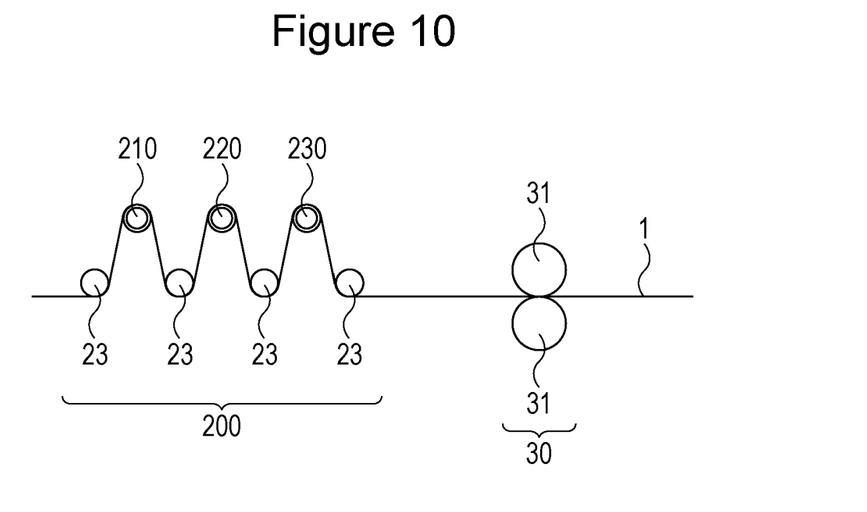
FIG. 10 illustrates a stretching unit and a compression unit according to the third modification.
Figure 11A:
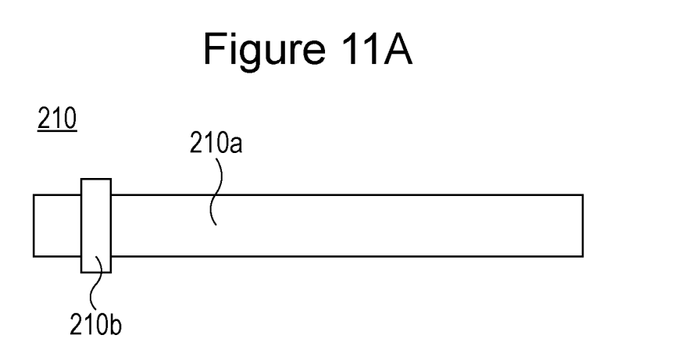
FIGS. 11A to 11C illustrate stretching rollers and guide rollers according to the third modification.
Figure 11B:
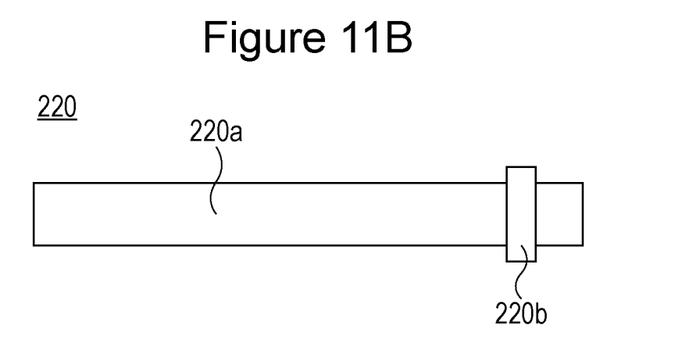
Figure 11C:
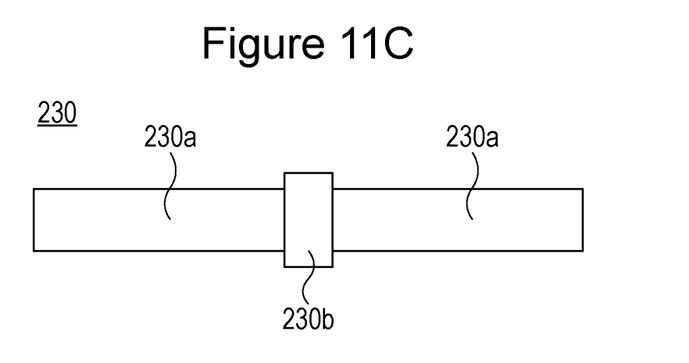

FIG. 10 illustrates a stretching unit 200 and a compression unit 30 according to the third modification. FIGS. 11A to 11C illustrate a first stretching roller 210, a second stretching roller 220, and a third stretching roller 230, respectively, of the stretching unit 200 according to the third modification.

The first stretching roller 210 includes a body 210a and a large-diameter portion 210b having a larger diameter than the body 210a on one side of the body 210a in the lateral direction. The second stretching roller 220 includes a body 220a and a large-diameter portion 220b having a larger diameter than the body 220a on the other side of the body 220a in the lateral direction. The third stretching roller 230 includes a body 230a and a large-diameter portion 230b having a larger diameter than the body 230a in the center of the body 230a in the lateral direction.

In FIG. 10, the large-diameter portion 210b of the first stretching roller 210 is located closer to the viewer, the large-diameter portion 220b of the second stretching roller 220 is located farther away from the viewer, and the large-diameter portion 230b of the third stretching roller 230 is located in the center. Thus, before compression, the positive electrode 100 is stretched in the following order: the first exposed region $100d_1$, the third exposed region $100d_3$, and the second exposed region $100d_2$. The positive electrode 100 is then compressed by the compression unit 30, which compresses the positive electrode active material layer 100b to increase its packing density. The compressed positive electrode 100 is cut along lines C-C in FIG. 9, followed by coiling and cutting to a predetermined length for the fabrication of electrode assemblies.

Prismatic Secondary Battery

Figure 12:
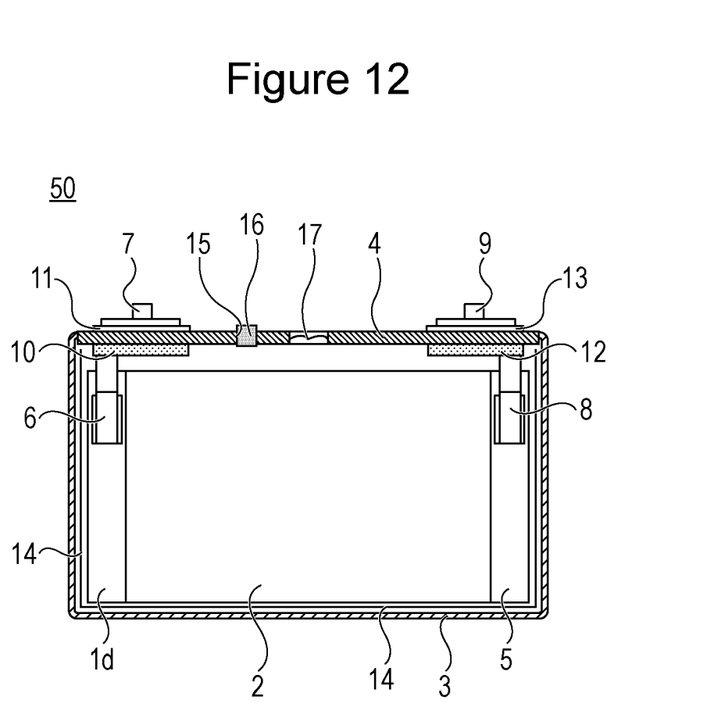
FIG. 12 is a sectional view of a prismatic secondary battery.

A secondary battery including a positive electrode fabricated as described above is illustrated by a prismatic secondary battery 50 shown in FIG. 12.

Fabrication of Negative Electrode

A negative electrode active material layer slurry is prepared by mixing graphite, serving as a negative electrode active material, styrene-butadiene rubber (SBR), serving as a binder, carboxymethylcellulose (CMC), serving as a thickener, and water. The negative electrode active material layer slurry is applied to each surface of a strip of copper foil with a thickness of 8 µm, serving as a negative electrode substrate. The negative electrode active material layer slurry is dried to remove water therefrom, thus forming a negative electrode active material layer on the negative electrode substrate. The negative electrode active material layer is then compressed to a predetermined thickness. The resulting negative electrode is cut into a strip such that the negative electrode substrate has an exposed region 5 extending along one lateral edge of the negative electrode in the longitudinal direction.

Fabrication of Electrode Assembly

The strip-shaped positive electrode 1 and negative electrode fabricated as described above are wound together with a polyolefin separator therebetween and are pressed into a flat shape. The resulting flat wound electrode assembly 2 has the exposed region 1d of the positive electrode substrate wound at one end in the winding axis direction and the exposed region 5 of the negative electrode substrate wound at the other end in the winding axis direction.

As shown in FIG. 12, the wound electrode assembly 2 and an electrolyte are placed in a prismatic metal casing 3 with an opening. The opening of the casing 3 is sealed with a metal sealing plate 4. A resin insulating sheet 14 is disposed between the wound electrode assembly 2 and the casing 3.

A metal positive electrode current collector 6 connected to the exposed region 1d of the positive electrode substrate of the wound electrode assembly 2 is electrically connected to a positive terminal 7 attached to the sealing plate 4. The positive electrode current collector 6 and the sealing plate 4 are insulated from each other by a resin insulating member 10. The positive terminal 7 and the sealing plate 4 are insulated from each other by a resin insulating member 11. A metal negative electrode current collector 8 connected to the exposed region 5 of the negative electrode substrate of the wound electrode assembly 2 is electrically connected to a negative terminal 9 attached to the sealing plate 4. The negative electrode current collector 8 and the sealing plate 4 are insulated from each other by a resin insulating member 12. The negative terminal 9 and the sealing plate 4 are insulated from each other by a resin insulating member 13.

The sealing plate 4 has an inlet 15 through which a liquid electrolyte containing an electrolyte salt such as a lithium salt and a nonaqueous solvent such as a carbonate is injected. After injection, the inlet 15 is sealed with a sealing plug 16. The sealing plate 4 has a vent 17 that opens and releases gas from the battery when the internal pressure of the battery is at or above a predetermined level. A current interruption mechanism may be provided in the conduction path between the positive electrode 1 and the positive terminal 7 or in the conduction path between the negative electrode and the negative terminal 9. The current interruption mechanism is preferably activated to break the conduction path when the internal pressure of the battery is at or above a predetermined level. The activation pressure of the current interruption mechanism is set to be lower than the activation pressure of the vent.

Other Embodiments

Although the present invention may be applied to both positive electrodes and negative electrodes, it is particularly effective for positive electrodes. Specifically, the present invention is effective for a positive electrode including a positive electrode active material layer having a packing density after compression of 2.7 g/cm$^3$ or more, particularly 2.85 g/cm$^3$ or more.

Although electrodes fabricated according to the present invention may be used for both wound electrode assemblies and laminated electrode assemblies, they are particularly effective for wound electrode assemblies.

Preferred positive electrode active materials include lithium transition metal oxides, particularly those containing at least one of nickel, cobalt, and manganese.

The negative electrode active material may be a carbonaceous material capable of absorbing and releasing lithium ions. Examples of carbonaceous materials capable of absorbing and releasing lithium ions include graphite, non-graphitizable carbon, graphitizable carbon, filamentous carbon, coke, and carbon black. Examples of noncarbonaceous materials include silicon, tin, and alloys and oxides thereof.

Examples of binders that may be present in the active material layers and protective layers of the electrodes include poly(vinylidene fluoride) (PVdF), polytetrafluoroethylene, polyethylene, polypropylene, aramid resins, polyamides, polyimides, polyamide-imides, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyethers, polyethersulfones, polyhexafluoropropylene, styrene-butadiene rubber, carboxymethylcellulose, acrylic rubbers, and acrylate binders (acrylate esters and salts). These may be used alone or in combination. The active material layers and the protective layers may contain the same or different binders. Resin binders are preferred.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method for manufacturing an electrode comprising a strip-shaped substrate and an active material layer containing an active material on the substrate, the method comprising the steps of:

forming the active material layer on the substrate in a longitudinal direction of the substrate such that the substrate has first and second exposed regions extending in the longitudinal direction of the substrate on opposing sides of the active material layer in a lateral direction of the substrate;

a first stretching step stretching the first exposed region of the substrate after the step of forming the active material layer;

a second stretching step stretching the second exposed region of the substrate; and compressing the active material layer after the second stretching step, wherein the first stretching step causes the first exposed region to stretch while the second exposed regions remains substantially unstretched, and the second stretching step causes the second exposed region to stretch while the first exposed regions remains substantially unstretched, wherein the second stretching step is performed after the first stretching step.

2. The method for manufacturing the electrode according to claim 1, wherein the first stretching step comprises stretching the first exposed region of the substrate with a first stretching roller in abutment with the first exposed region of the substrate, and the second stretching step comprises stretching the second exposed region of the substrate with a second stretching roller, separate and different from the first stretching roller, in abutment with the second exposed region of the substrate.

3. The method for manufacturing the electrode according to claim 2, wherein
a guide roller is disposed between the first and second stretching rollers, and
the substrate is tensioned by the guide roller.

4. The method for manufacturing the electrode according to claim 3, wherein a path through which the substrate passes includes, in order from upstream, the first stretching roller, the guide roller, and the second stretching roller.

5. The method for manufacturing the electrode according to claim 2, wherein
the first stretching roller comprises a first body and a first large-diameter portion having a larger diameter than the first body,
the second stretching roller comprises a second body and a second large-diameter portion having a larger diameter than the second body,
the first large-diameter portion stretches the first exposed region of the substrate, and
the second large-diameter portion stretches the second exposed region of the substrate.

6. The method for manufacturing the electrode according to claim 1,
wherein the electrode further comprises a protective layer disposed on at least a portion of the first exposed region;
the protective layer includes a binder and at least one of the group consisting of alumina, zirconia, titania, and silica; and
the first stretching step includes stretching the portion of the first exposed region with the protective layer.

7. The method for manufacturing the electrode according to claim 1,
wherein the electrode further comprises a protective layer disposed on at least a portion of the first exposed region;
the protective layer being thinner than the active material layer; and
the first stretching step includes stretching the portion of the first exposed region with the protective layer.

8. The method for manufacturing the electrode according to claim 1,
wherein the electrode further comprises a protective layer disposed on at least a portion of the first exposed region, and a binder;
a mass percentage of the binder within the protective layer is greater than a mass percentage of the binder within the active material layer; and
the first stretching step includes stretching the portion of the first exposed region with the protective layer.

9. The method for manufacturing the electrode according to claim 1,
wherein the electrode further comprises a protective layer disposed on at least a portion of the first exposed region, and a binder;
a mass percentage of the binder in the protective layer is 10% by mass or greater; and
the first stretching step includes stretching the portion of the first exposed region with the protective layer.

10. The method for manufacturing the electrode according to claim 1,
wherein the electrode further comprises a third exposed region of the substrate provided between the first and second exposed regions in the lateral direction of the substrate; and
stretching the third exposed region of the substrate.

11. The method for manufacturing the electrode according to claim 10,
wherein the stretching of the third exposed region of the substrate is performed after the second stretching step and before the compression step.

12. A method for manufacturing a secondary battery, comprising the steps of:
fabricating an electrode assembly comprising a positive electrode, a negative electrode, and a separator, the positive electrode being manufactured by the method according to claim 1; and
placing the electrode assembly and a nonaqueous electrolyte in a casing.

13. A method for manufacturing an electrode comprising a strip-shaped substrate and an active material layer containing an active material on the substrate, the method comprising the steps of:
forming the active material layer on the substrate in a longitudinal direction of the substrate such that the substrate has first and second exposed regions extending in the longitudinal direction of the substrate on opposing sides of the active material layer in a lateral direction of the substrate;
a first stretching step stretching the first exposed region of the substrate after the step of forming the active material layer;
a second stretching step stretching the second exposed region of the substrate, wherein the second stretching step is performed after the first stretching step;
compressing the active material layer after the second stretching step;
and
wherein an amount by which the first exposed region is stretched in the first stretching step is greater than an amount by which the second exposed region is stretched in the first stretching step, and an amount by which the second exposed region is stretched in the second stretching step is greater than an amount by which the first exposed region is stretched in the second stretching step.

14. The method for manufacturing the electrode according to claim 13,
wherein the electrode further comprises a protective layer disposed on at least a portion of the first exposed region, and a binder;
a mass percentage of the binder within the protective layer is greater than a mass percentage of the binder within the active material layer; and
the first stretching step includes stretching the portion of the first exposed region with the protective layer.

15. The method for manufacturing the electrode according to claim 13,
wherein the electrode further comprises a protective layer disposed on at least a portion of the first exposed region;
the protective layer includes a binder and at least one of the group consisting of alumina, zirconia, titania, and silica; and
the first stretching step includes stretching the portion of the first exposed region with the protective layer.

16. The method for manufacturing the electrode according to claim 13,
wherein the electrode further comprises a third exposed region of the substrate provided between the first and second exposed regions in the lateral direction of the substrate; and a third stretching step stretching the third exposed region of the substrate.

17. A method for manufacturing a secondary battery, comprising the steps of:
   fabricating an electrode assembly comprising a positive electrode, a negative electrode, and a separator, the positive electrode being manufactured by the method according to claim 13; and
   placing the electrode assembly and a nonaqueous electrolyte in a casing.

18. A method for manufacturing an electrode comprising a strip-shaped substrate and an active material layer containing an active material on the substrate, the method comprising the steps of:
   forming the active material layer on the substrate in a longitudinal direction of the substrate such that the substrate has first and second exposed regions extending in the longitudinal direction of the substrate on opposing sides of the active material layer in a lateral direction of the substrate;
   a first stretching step stretching the first exposed region of the substrate after the step of forming the active material layer;
   a second stretching step stretching the second exposed region of the substrate, wherein the second stretching step is performed after the first stretching step;
   compressing the active material layer after the second stretching step; and
   the first stretching step comprises stretching the first exposed region of the substrate with a first stretching roller in abutment with the first exposed region of the substrate;
   the second stretching step comprises stretching the second exposed region of the substrate with a second stretching roller, separate and different from the first stretching roller, in abutment with the second exposed region of the substrate;
   the first stretching roller includes a first portion to face the first exposed region and a second portion to face the second exposed portion, wherein a maximum diameter of the first portion of the stretching roller is greater than a maximum diameter of the second portion of the first stretching roller; and
   the second stretching roller includes a first portion to face the exposed region and a second portion to face the second exposed portion, wherein a maximum diameter of the second portion of the second stretching roller is greater than a maximum diameter of the first portion of the second stretching roller.

19. The method for manufacturing the electrode according to claim 18,
   wherein the electrode further comprises a protective layer disposed on at least a portion of the first exposed region;
   the protective layer includes a binder and at least one of the group consisting of alumina, zirconia, titania, and silica; and
   the first stretching step includes stretching the portion of the first exposed region with the protective layer.

20. A method for manufacturing a secondary battery, comprising the steps of:
   fabricating an electrode assembly comprising a positive electrode, a negative electrode, and a separator, the positive electrode being manufactured by the method according to claim 18; and
   placing the electrode assembly and a nonaqueous electrolyte in a casing.

\* \* \* \* \*